US012736198B1

(12) United States Patent
Park et al.

(10) Patent No.: US 12,736,198 B1
(45) Date of Patent: Sep. 15, 2026

(54) LENS FOR AN EXTERNAL LIGHT OF A VEHICLE

(71) Applicant: GM Global Technology Operations LLC, Detroit, MI (US)

(72) Inventors: Jonglee Park, Novi, MI (US); Helgert Elezi, Saint Clair Shores, MI (US); Jodi Mary Jean Allen, Orion, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 19/382,856

(22) Filed: Nov. 7, 2025

(51) Int. Cl.
*F21S 41/20* (2018.01)
*F21S 43/20* (2018.01)

(52) U.S. Cl.
CPC ....... *F21S 41/285* (2018.01); *F21S 43/26271* (2024.05)

(58) Field of Classification Search
CPC .......................... F21S 41/285; F21S 43/26271
See application file for complete search history.

(56) References Cited

U.S. PATENT DOCUMENTS 5,973,844 A * 10/1999 Burger ................. G02B 3/0056 359/621
11,085,605 B2 * 8/2021 Iwakura ................... B60Q 1/34
11,789,352 B2 * 10/2023 Park ........................... B60J 1/02 348/148
2012/0106167 A1 5/2012 Chang
2014/0340918 A1 * 11/2014 Suckling ................. F21S 41/12 362/510
2017/0184707 A1 * 6/2017 Sugiura ................... G01S 17/08
2019/0234581 A1 * 8/2019 Iwakura ................... B60Q 1/34
2023/0136351 A1 * 5/2023 Park ........................... B60J 1/02 348/148

FOREIGN PATENT DOCUMENTS

DE 202014100462 U1 3/2014
DE 102016122860 A1 6/2017
DE 102019108232 A1 10/2020
DE 102023130570 83 1/2025

* cited by examiner

*Primary Examiner* — Leah Macchiarolo
(74) *Attorney, Agent, or Firm* — Vivacqua Crane, PLLC

(57) ABSTRACT

A lens for a vehicle is provided. The lens includes a first lens portion adjacent to one or more light sources emitting a polychromatic light. The first lens portion includes a first entry surface, a first exit surface, and a first diffraction portion adjacent to at least a section of the first exit surface. The polychromatic light enters the first lens portion through the first entry surface. The first diffraction portion diffracts the polychromatic light. The lens further includes a final lens portion adjacent to the first lens portion. The final lens portion includes a final entry surface, a final exit surface, and a final diffraction portion adjacent to at least a section of the final exit surface. The polychromatic light enters the final lens portion through the final entry surface. The final diffraction portion diffracts the polychromatic light. A white output light is released from the final exit surface.

20 Claims, 5 Drawing Sheets

LENS FOR AN EXTERNAL LIGHT OF A VEHICLE

INTRODUCTION

The present disclosure relates to a lens. More specifically, the present disclosure relates to a lens for an external light of a vehicle.

The external light of a vehicle may have one or more light sources that emit a light towards a lens. To create a unique lit and unlit pattern on the lens, the lens may include textures or a grained surface. However, the textures or grained surface on the lens do not have the capability to separate certain wavelengths, limiting the color appearance.

Thus, while current lenses achieve their intended purpose, there is a need for a new and improved lens for the external light of the vehicle.

SUMMARY

According to several aspects, a lens for a vehicle having one or more light sources emitting a polychromatic light is provided. The lens includes a first lens portion adjacent to the one or more light sources. The first lens portion includes a first entry surface. The emitted polychromatic light enters the first lens portion through the first entry surface. The first lens portion further includes a first exit surface opposing the first entry surface. The polychromatic light is released from the first exit surface. The first lens portion further includes a first diffraction portion adjacent to at least a section of the first exit surface, diffracting the emitted polychromatic light and creating distinct beams. The lens further includes a final lens portion adjacent to the first lens portion. The final lens portion includes a final entry surface. The polychromatic light enters the final lens portion through the final entry surface. The final lens portion further includes a final exit surface opposing the final entry surface. The final lens portion further includes a final diffraction portion adjacent to at least a section of the final exit surface, diffracting the polychromatic light. A white output light is released from the final exit surface.

In an additional aspect of the present disclosure, the first lens portion has layers. The layers include a laminate and the first diffraction portion. The first diffraction portion is a diffraction film adhered to the laminate by an adhesive.

In another aspect of the present disclosure, the first entry surface is disposed on the laminate and the first exit surface is disposed on the diffraction film.

In another aspect of the present disclosure, the final lens portion has layers. The layers include a laminate and the final diffraction portion. The final diffraction portion is a diffraction film adhered to the laminate by an adhesive.

In another aspect of the present disclosure, the final entry surface is disposed on the laminate and the diffraction film is disposed on at least a section of the final exit surface.

In another aspect of the present disclosure, the first diffraction portion is a diffraction lens. The diffraction lens having microscopic grooves disposed on at least a section of the first exit surface.

In another aspect of the present disclosure, the final diffraction portion is a diffraction lens. The diffraction lens having microscopic grooves disposed on at least a section of the final exit surface.

In another aspect of the present disclosure, the lens further includes at least one middle lens portion positioned between the first lens portion and the final lens portion. The at least one middle lens portion includes a middle entry surface. The polychromatic light released from the first exit surface enters the at least one middle lens portion through the middle entry surface. The at least one middle lens portion further includes a middle exit surface opposing the middle entry surface. The polychromatic light is released from the middle exit surface. The at least one middle lens portion further includes a middle diffraction portion adjacent to at least a section of the middle exit surface, diffracting the polychromatic light.

In another aspect of the present disclosure, the at least one middle lens portion has layers. The layers include a laminate and the middle diffraction portion. The middle diffraction portion is a diffraction film adhered to the laminate by an adhesive.

In another aspect of the present disclosure, the middle entry surface is disposed on the laminate and the diffraction film is disposed on at least a section of the middle exit surface.

In another aspect of the present disclosure, the middle diffraction portion is a diffraction lens. The diffraction lens having microscopic grooves disposed on at least a section of the middle exit surface.

According to several aspects, an external light for a vehicle is provided. The external light includes one or more light sources. The one or more light sources emit a polychromatic light. The external light further includes a lens. The lens includes a first lens portion adjacent to the one or more light sources. The first lens portion includes a first entry surface. The emitted polychromatic light enters the first lens portion through the first entry surface. The first lens portion further includes a first exit surface opposing the first entry surface. The polychromatic light is released from the first exit surface. The first lens portion further includes a first diffraction portion adjacent to at least a section of the first exit surface, diffracting the emitted polychromatic light and creating distinct beams. The lens further includes a final lens portion adjacent to the first lens portion. The final lens portion includes a final entry surface. The polychromatic light enters the final lens portion through the final entry surface. The final lens portion further includes a final exit surface opposing the final entry surface. The final lens portion further includes a final diffraction portion adjacent to at least a section of the final exit surface, diffracting the polychromatic light. A white output light is released from the final exit surface.

In another aspect of the present disclosure, the first lens portion has layers. The layers include a laminate and the first diffraction portion. The first diffraction portion is a diffraction film adhered to the laminate by an adhesive. The first entry surface is disposed on the laminate and the diffraction film is disposed on at least a section of the first exit surface.

In another aspect of the present disclosure, the final lens portion has layers. The layers include a laminate and the final diffraction portion. The final diffraction portion is a diffraction film adhered to the laminate by an adhesive. The final entry surface is disposed on the laminate and the diffraction film is disposed on at least a section of the final exit surface.

In another aspect of the present disclosure, the first diffraction portion is a diffraction lens. The diffraction lens having microscopic grooves disposed on at least a section of the first exit surface.

In another aspect of the present disclosure, the final diffraction portion is a diffraction lens. The diffraction lens having microscopic grooves disposed on at least a section of the final exit surface.

In another aspect of the present disclosure, the lens further includes at least one middle lens portion positioned between the first lens portion and the final lens portion. The at least one middle lens portion includes a middle entry surface. The polychromatic light released from the first exit surface enters the at least one middle lens portion through the middle entry surface. The at least one middle lens portion further includes a middle exit surface opposing the middle entry surface. The polychromatic light is released from the middle exit surface. The at least one middle lens portion further includes a middle diffraction portion adjacent to at least a section of the middle exit surface, diffracting the polychromatic light.

In another aspect of the present disclosure, the at least one middle lens portion has layers. The layers include a laminate and the middle diffraction portion. The middle diffraction portion is a diffraction film adhered to the laminate by an adhesive. The middle entry surface is disposed on the laminate and the diffraction film is disposed on at least a section of the middle exit surface.

In another aspect of the present disclosure, the middle diffraction portion is a diffraction lens. The diffraction lens having microscopic grooves disposed on at least a section of the middle exit surface.

According to several aspects, an external light for a vehicle is provided. The external light includes one or more light sources. The one or more light sources emit a polychromatic light. The external light further includes a lens. The lens includes a first lens portion adjacent to the one or more light sources. The first lens portion includes a first entry surface. The emitted polychromatic light enters the first lens portion through the first entry surface. The first lens portion further includes a first exit surface opposing the first entry surface. The polychromatic light is released from the first exit surface. The first lens portion further includes a first diffraction portion adjacent to at least a section of the first exit surface, diffracting the emitted polychromatic light and creating distinct beams. The lens further includes at least one middle lens portion adjacent to the first lens portion. The at least one middle lens portion includes a middle entry surface. The polychromatic light released from the first exit surface enters the at least one middle lens portion through the middle entry surface. The at least one middle lens portion further includes a middle exit surface opposing the middle entry surface. The polychromatic light is released from the middle exit surface. The at least one middle lens portion further includes a middle diffraction portion adjacent to at least a section of the middle exit surface, diffracting the polychromatic light. The lens further includes a final lens portion adjacent to the at least one middle lens portion. The final lens portion includes a final entry surface. The polychromatic light released from the at least one middle lens portion enters the final lens portion through the final entry surface. The final lens portion further includes a final exit surface opposing the final entry surface. The final lens portion further includes a final diffraction portion adjacent to at least a section of the final exit surface, diffracting the polychromatic light. A white output light is released from the final exit surface.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
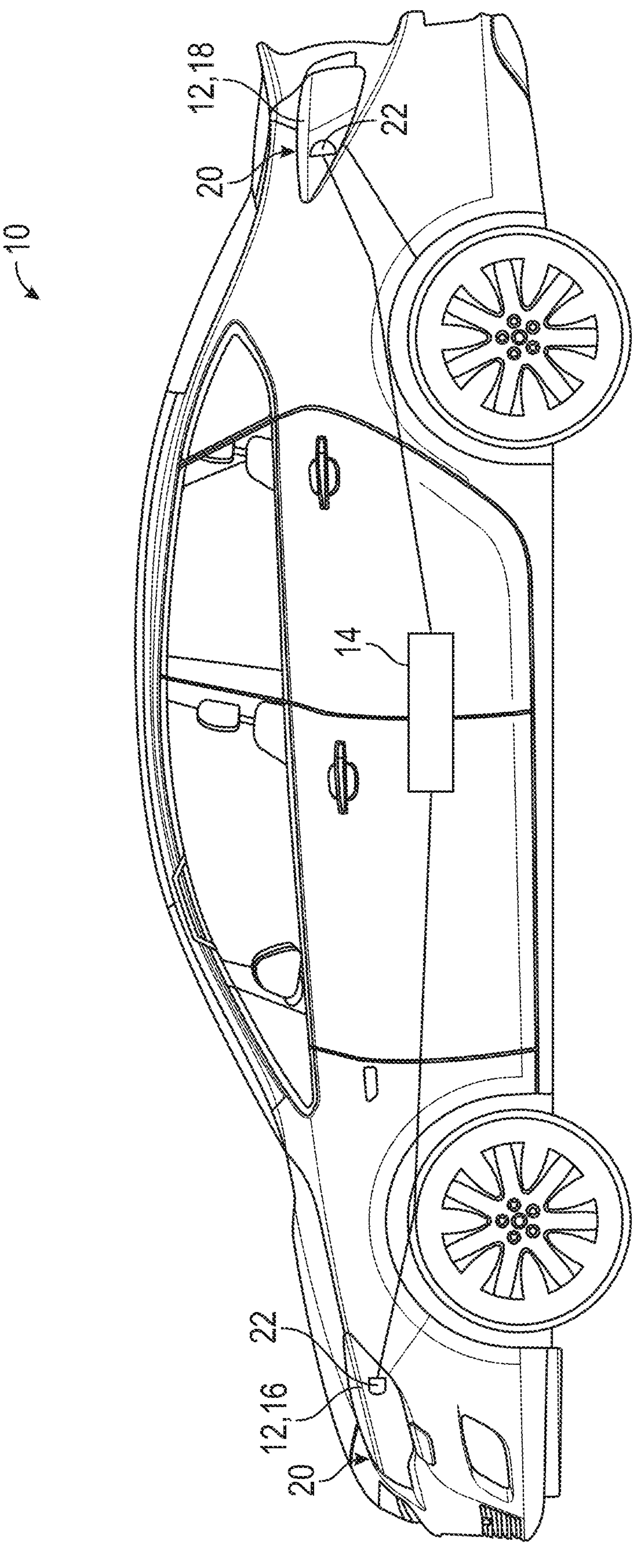
FIG. 1 is a side view of a vehicle including an external light according to an exemplary embodiment.

Referring to FIG. 1, a side view of a vehicle 10 is illustrated. It should be appreciated that FIG. 1 is merely exemplary in nature and the vehicle 10 may be any type of vehicle such as, but not limited to, a sedan, a truck, a sport utility vehicle, a van, or a motor home. The vehicle 10 may include an external light 12 and a battery 14. The external light 12 may be headlights 16 and/or taillights 18 of the vehicle 10. The battery 14 may be connected to the external light 12, powering the external light 12. The external light 12 includes a lens 20 and one or more light sources 22. When the battery 14 powers the external light 12, the one or more light sources 22 emit a polychromatic light 24 towards the lens 20.

Figure 2:
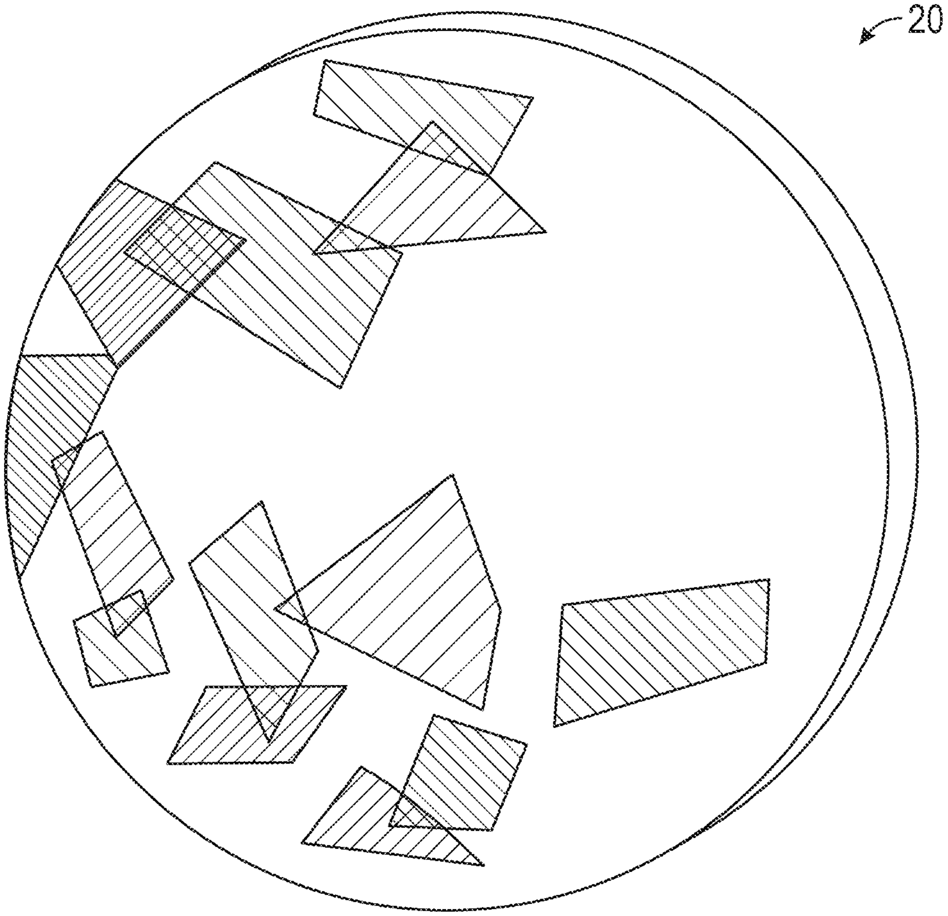
FIG. 2 is an enlarged view of a lens for the external light according to an exemplary embodiment.

Referring to FIG. 2, an enlarged view of the lens 20 is illustrated. The lens 20 generates a brilliant looking appearance by diffracting light. For example, the lens 20 may diffract the polychromatic light 24 emitted by the one or more light sources 22 (shown in FIG. 1) to generate a multi-color appearance. Alternatively, the lens 20 may diffract an environmental light to generate the multi-color appearance. The diffraction process is described in further detail below. While the lens 20 creates a unique multi-color appearance, the lens 20 maintains a legal clear color and a legal white output color under the Federal Motor Vehicle Safety Standard (FMVSS) No. 108.

Figure 3:
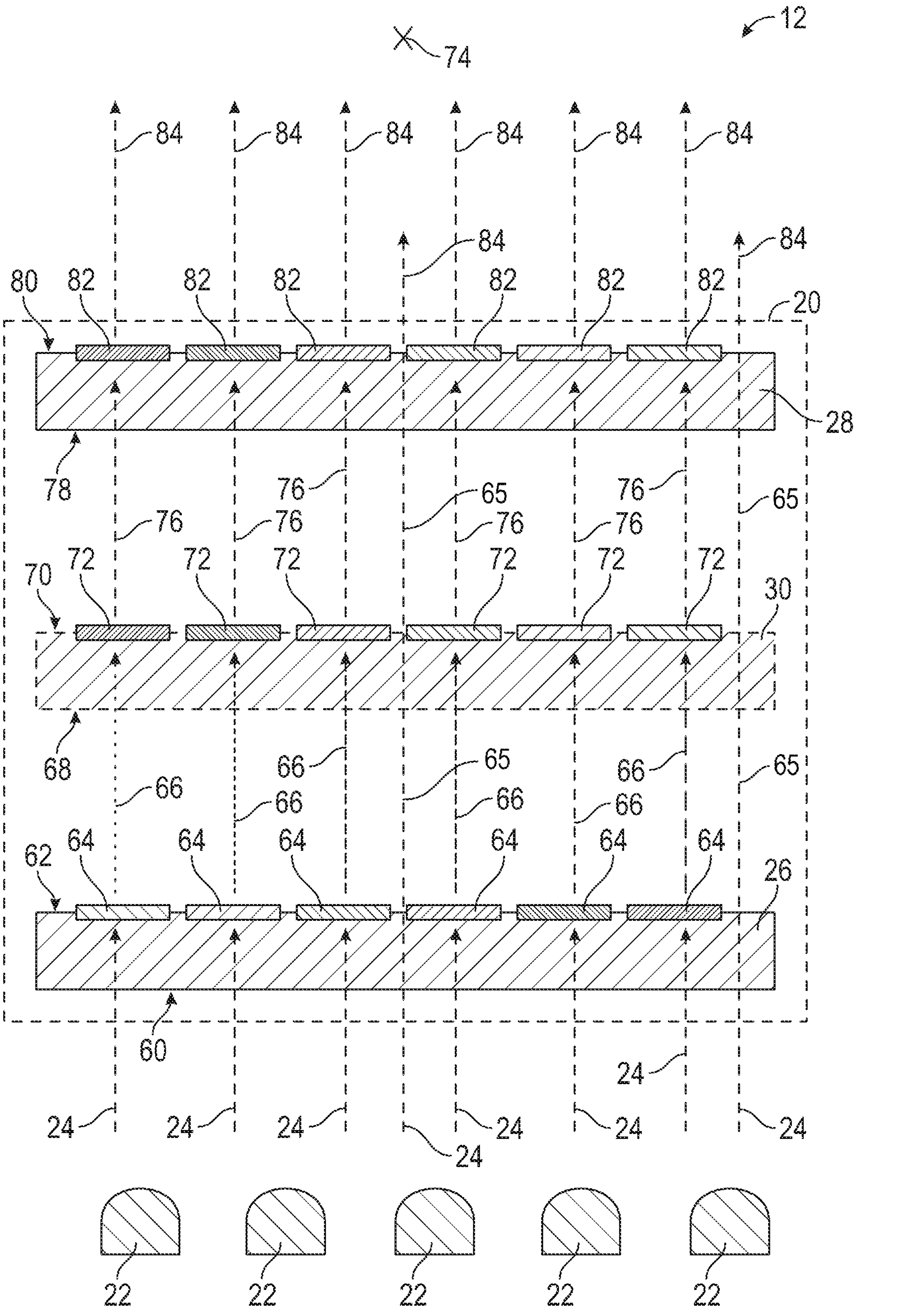
FIG. 3 is a schematic drawing of the external light according to an exemplary embodiment.

Referring to FIG. 3, a schematic drawing of the external light 12 is illustrated. The polychromatic light 24 emitted by the one or more light sources 22 travels towards and through the lens 20. The lens 20 may include a first lens portion 26 and a final lens portion 28. The first lens portion 26 may be adjacent to the final lens portion 28. The first lens portion 26 may be, but not limited to, connected to the final lens portion 28 by an adhesive. Alternatively, as shown in FIG. 3, at least one middle lens portion 30 may be positioned between the first lens portion 26 and the final lens portion 28. The at least one middle lens portion 30 may be, but not limited to, connected to the first lens portion 26 and to the final lens portion 28 by an adhesive. The first lens portion 26, the at least one middle lens portion 30, and the final lens portion 28 diffract and direct the emitted polychromatic light 24. The first lens portion 26, the at least one middle lens portion 30, and the final lens portion 28 are described in further detail below.

Figure 4:
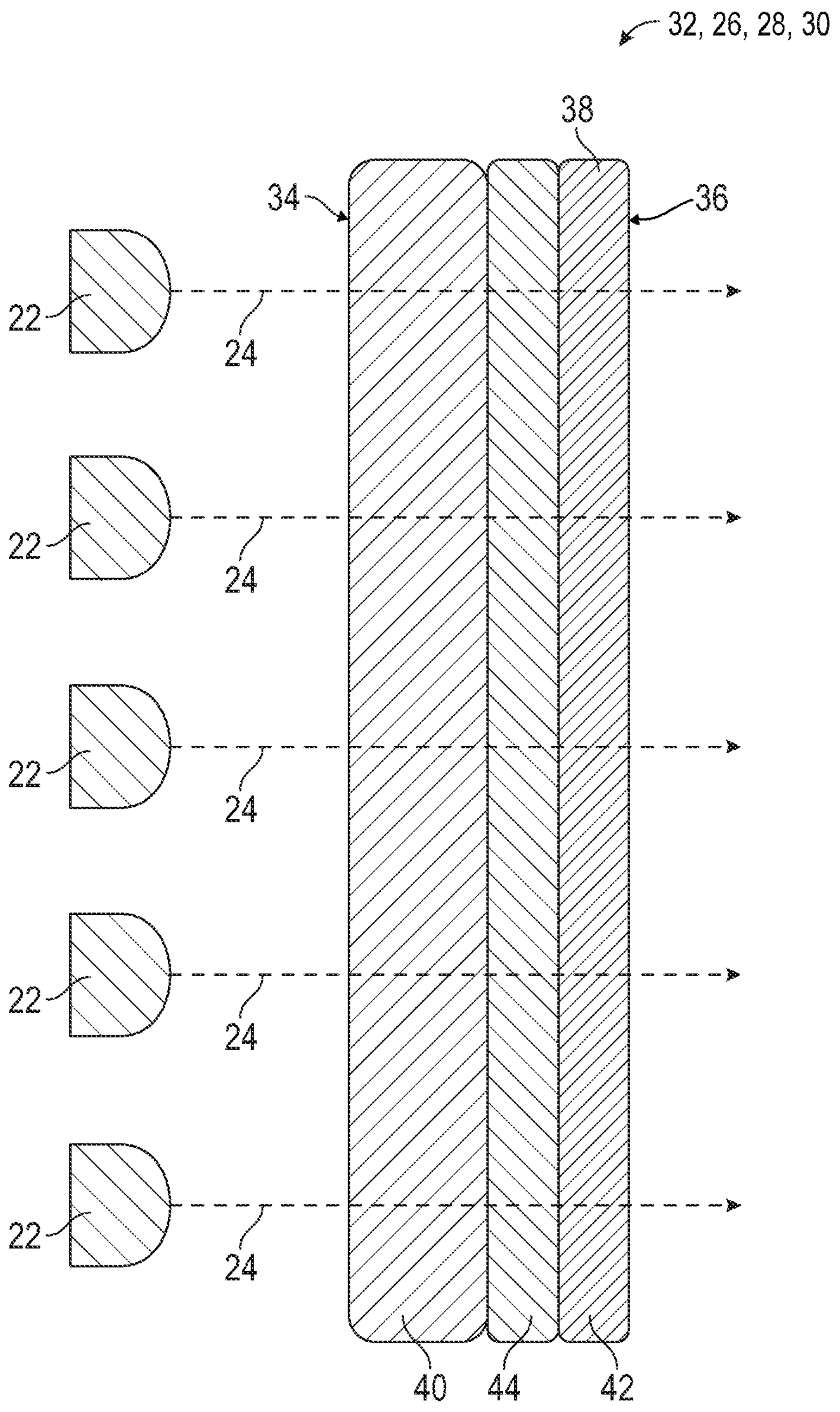
FIG. 4 is a schematic drawing of a portion of the lens according to an exemplary embodiment.

Referring to FIG. 4, a portion 32 of the lens 20 is illustrated. The portion 32 may be the first lens portion 26, the at least one middle lens portion 30, or the final lens portion 28. More than one portion 32 may be stacked against one another to form the lens 20, as shown in FIG. 3.

The portion 32 may be formed by film lamination and includes an entry surface 34, an exit surface 36, and a diffraction portion 38. The polychromatic light 24 emitted from the one or more light sources 22 enters the portion 32 through the entry surface 34 and exits from the exit surface 36. The portion 32 has layers including a laminate 40 and the diffraction portion 38. The entry surface 34 is disposed on the laminate 40 and the diffraction portion 38 is disposed on at least a section of the exit surface 36. The laminate 40 may be a clear polymer such as, but not limited to, polycarbonates (PC), polymethyl methacrylate (PMMA), or silicone. The diffraction portion 38 may be a diffraction film 42 and the diffraction film 42 may be adhered to the laminate 40 by an adhesive 44. The adhesive 44 may be an optically clear adhesive or a semi-transparent adhesive.

Figure 5:
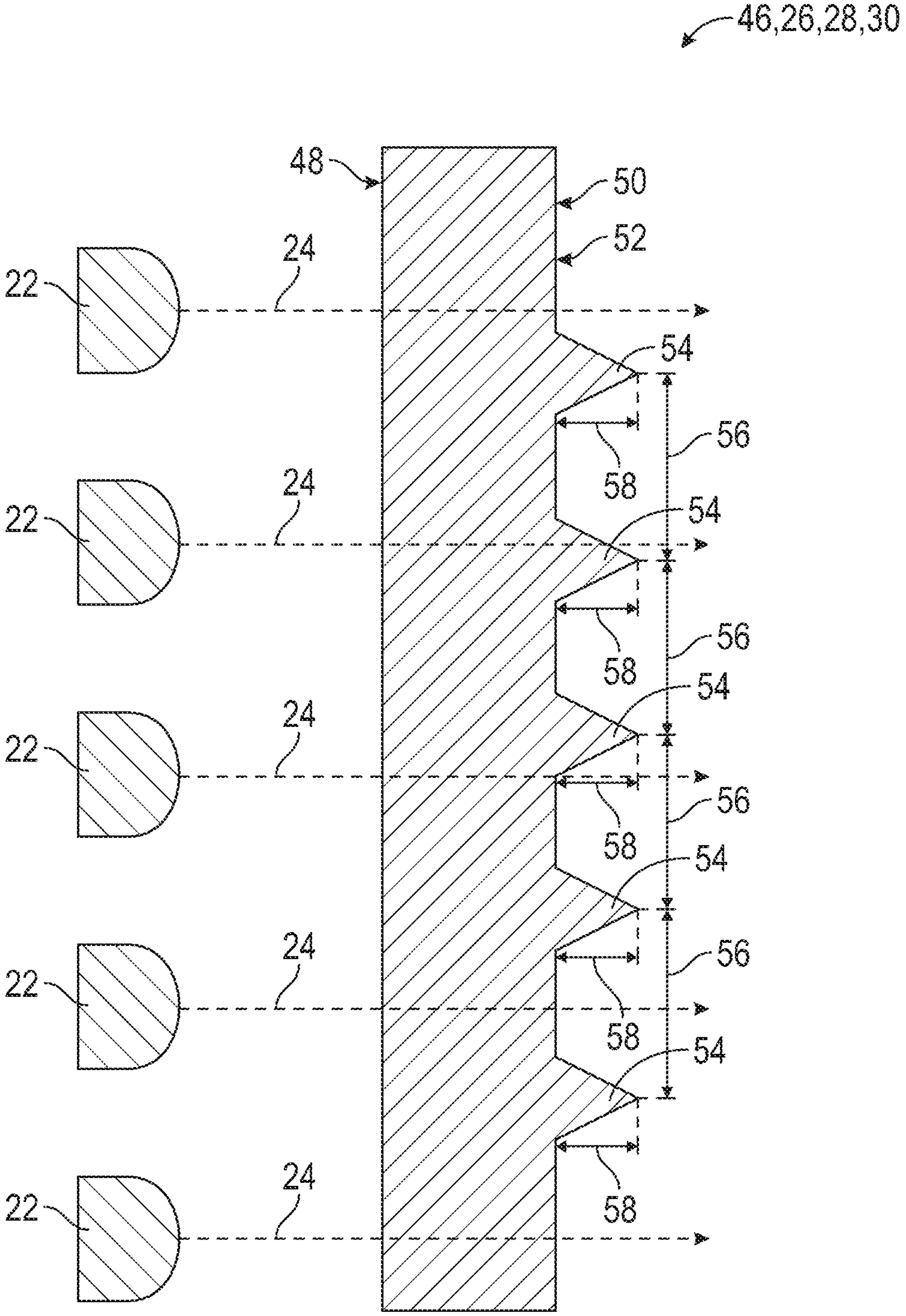
FIG. 5 is a schematic drawing of an alternate portion of the lens according to an exemplary embodiment.

Referring to FIG. 5, an alternate embodiment of the portion 32, indicated by reference number 46, is illustrated. The portion may be glass or a clear polymer such as, but not limited to, PC, PMMA, or silicone. The portion 46 may be the first lens portion 26, the at least one middle lens portion 30, or the final lens portion 28. More than one portion 46 may be stacked against one another to form the lens 20 (shown in FIG. 3).

The portion 46 includes an entry surface 48, an exit surface 50, and a diffraction portion 52. The polychromatic light 24 emitted from the one or more light sources 22 enters the portion 46 through the entry surface 48 and exits from the exit surface 50. When the portion 46 is glass, the portion 46 may be laser engraved, forming the diffraction portion 52 as a diffraction lens. Alternatively, when the portion is a clear polymer, the portion 46 may be formed by injection molding, forming the diffraction portion 52 as the diffraction lens. The diffraction lens includes a plurality of microscopic grooves 54 disposed on at least a section of the exit surface 50. The plurality of microscopic grooves 54 has a groove spacing 56 and a groove depth 58. The groove spacing 56 may be between 1.25-3.33 micrometers (μm). In this context, the term "about" is known to those skilled in the art. Alternatively, the term "about" may be read to mean plus or minus 5 μm. The groove depth 58 may be between about 50 nanometers (nm) and 2 μm. In this context, the term "about" is known to those skilled in the art. Alternatively, the term "about" may be read to mean plus or minus 5 nm.

Referring back to FIG. 3, the one or more light sources 22 emits the polychromatic light 24 which travels through the lens 20. The lens 20 may include the first lens portion 26, the at least one middle lens portion 30, and the final lens portion 28. The first lens portion 26, the at least one middle lens portion 30, and the final lens portion 28 may be the portion 32 (shown in FIG. 4) or the alternate portion 46 (shown in FIG. 5). It should be appreciated that FIG. 3 is merely exemplary in nature and the lens 20 is not limited to three portions 32, 46. The lens 20 may include the first lens portion 26 and the final lens portion 28. Alternatively, the lens 20 may include the first lens portion 26, the final lens portion 28, and the at least one middle lens portion 30, where the at least one middle lens portion 30 may include more than one portion 32, 46.

The polychromatic light 24 emitted by the one or more light sources 22 is a light that consists of multiple different wavelengths. The multiple different wavelengths may range from about 380-750 nm. In this context, the term "about" is known to those skilled in the art. Alternatively, the term "about" may be read to mean plus or minus 5 nm. The polychromatic light 24 enters the first lens portion 26. The first lens portion 26 includes a first entry surface 60, a first exit surface 62 opposing the first entry surface 60, and a first diffraction portion 64 adjacent to at least a section of the first exit surface 62. The first diffraction portion 64 may be the diffraction film 42 (shown in FIG. 4) adhered to at least a section the first lens portion 26. Alternatively, the first diffraction portion 64 may be the diffraction lens including microscopic grooves 54 (shown in FIG. 5) disposed on at least a section of the first exit surface 62.

The polychromatic light 24 enters the first lens portion 26 through the first entry surface 60 and is released from the first exit surface 62. The first diffraction portion 64 is adjacent to at least a section of the first exit surface 62. Some wavelengths of the polychromatic light 24 may exit the first exit surface 62 without traveling through the first diffraction portion 64, exiting the first lens portion 26 as an un-refracted light 65. Alternatively, all of the wavelengths of the polychromatic light 24 may travel through the first diffraction portion 64 prior to exiting the first lens portion 26. The first diffraction portion 64 diffracts each of the different wavelengths from the polychromatic light 24 at different angles, creating distinct beams 66. Each of the distinct beams 66 travel in different directions without overlapping. The distinct beams 66 exit the first lens portion 26 from the first exit surface 62.

If the lens 20 has the at least one middle lens portion 30, as shown in FIG. 3, the polychromatic light 24 travels towards the at least one middle lens portion 30 as the distinct beams 66 and/or as the un-refracted light 65 released from the first lens portion 26. The at least one middle lens portion 30 includes a middle entry surface 68, a middle exit surface 70 opposing the middle entry surface 68, and a middle diffraction portion 72 adjacent to at least a section of the middle exit surface 70. The polychromatic light 24 enters the at least one middle lens portion 30 through the middle entry surface 68 as the distinct beams 66 and/or as the un-refracted light 65. Some of the distinct beams 66 and the un-refracted light 65 may be released from the middle exit surface 70 without traveling through the middle diffraction portion 72, exiting the at least one middle lens portion 30 through the middle exit surface 70 as the un-refracted light 65. Alternatively, all of the distinct beams 66 and the un-refracted light 65 may travel through the middle diffraction portion 72 prior to exiting the at least one middle lens portion 30 through the middle exit surface 70.

The middle diffraction portion 72 may be the diffraction film 42 (shown in FIG. 4) adhered to at least a section of the at least one middle lens portion 30. Alternatively, the middle diffraction portion 72 may be the diffraction lens including microscopic grooves 54 (shown in FIG. 5) disposed on at least a section of the middle exit surface 70. The middle diffraction portion 72 may have a reversed grating pattern to bend the polychromatic light 24 towards a point 74, creating a further diffracted light 76. Bending the polychromatic light 24 towards the point 74 adjusts an angle that the further diffracted light 76 is dispersed, causing the angles of the further diffracted light 76 to at least partially overlap spatially.

If the lens 20 has the at least one middle lens portion 30, as shown in FIG. 3, the polychromatic light 24 travels towards the final lens portion 28 as the further diffracted light 76 and/or as the un-refracted light 65 released from the at least one middle lens portion 30. The final lens portion 28 includes a final entry surface 78, a final exit surface 80 opposing the final entry surface 78, and a final diffraction portion 82 adjacent to at least a section of the final exit surface 80. The polychromatic light 24 enters the final lens portion 28 through the final entry surface 78 as the further diffracted light 76 and/or the un-refracted light 65. Some of the further diffracted light 76 and the un-refracted light 65 may exit the final exit surface 80 through the final exit surface 80 without traveling through the final diffraction portion 82. Alternatively, all of the further diffracted light 76 and the un-refracted light 65 may travel through the final diffraction portion 82 prior to exiting the final lens portion 28 through the final exit surface 80.

The final diffraction portion 82 may be the diffraction film 42 (shown in FIG. 4) adhered to the final lens portion 28. Alternatively, the final diffraction portion 82 may be the diffraction lens including microscopic grooves 54 (shown in FIG. 5) disposed on at least a section of the final exit surface 80. The final diffraction portion 82 may have a grating pattern designed to complement or counteract the dispersion of the further diffracted light 76 that travels through the final diffraction portion 82, causing the multiple different wavelengths to combine. The combination of the multiple different wavelengths of the polychromatic light 24 creates a white output light 84. These wavelengths may range from about 380-750 nm. In this context, the term "about" is known to those skilled in the art. Alternatively, the term "about" may be read to mean plus or minus 5 nm. The white output light 84 is released from the lens 20 through the final exit surface 80, meeting the FMVSS No. 108.

Alternatively, if the lens 20 does not have the at least one middle lens portion 30, the polychromatic light 24 travels towards the final lens portion 28 as the distinct beams 66 and/or as the un-refracted light 65 released from the first lens portion 26. The final lens portion 28 includes the final entry surface 78, the final exit surface 80 opposing the final entry surface 78, and the final diffraction portion 82 adjacent to at least a section of the final exit surface 80. The polychromatic light 24 enters the final lens portion 28 through the final entry surface 78 as the distinct beams 66 and/or the un-refracted light 65. Some of the distinct beams 66 and the un-refracted light 65 may exit the final exit surface 80 through the final exit surface 80 without traveling through the final diffraction portion 82. Alternatively, all of the distinct beams 66 and the un-refracted light 65 may travel through the final diffraction portion 82 prior to exiting the final lens portion 28 through the final exit surface 80.

The final diffraction portion 82 may be the diffraction film 42 (shown in FIG. 4) adhered to the final lens portion 28. Alternatively, the final diffraction portion 82 may be the diffraction lens including microscopic grooves 54 (shown in FIG. 5) disposed on at least a section of the final exit surface 80. The final diffraction portion 82 may have a reversed grating pattern to bend the polychromatic light 24 that travels through the final diffraction portion 82 towards the point 74. Bending the polychromatic light 24 towards the point 74 adjusts the angle each wavelength of the polychromatic light 24 is dispersed, causing the angles to fully overlap and combine to create a white output light 84. The white output light 84 is a combination of the multiple wavelengths of the polychromatic light 24. These wavelengths may range from about 380-750 nm. In this context, the term "about" is known to those skilled in the art. Alternatively, the term "about" may be read to mean plus or minus 5 nm. The white output light 84 is released from the lens 20 through the final exit surface 80, meeting FMVSS No. 108.

The lens 20 of the present disclosure offers several advantages. These include having a brilliant looking appearance which creates a unique multi-color lit and unlit appearance. While the lens 20 may generate a multi-color appearance, the lens 20 maintains a legal clear color and a legal white output color under the FMVSS No. 108.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A lens for a vehicle having one or more light sources emitting a polychromatic light, the lens comprising:
- a first lens portion adjacent to the one or more light sources, wherein the first lens portion includes:
  - a first entry surface, wherein the emitted polychromatic light enters the first lens portion through the first entry surface;
  - a first exit surface opposing the first entry surface and wherein the polychromatic light is released from the first exit surface; and
  - a first diffraction portion adjacent to at least a section of the first exit surface, diffracting the emitted polychromatic light and creating distinct beams; and
- a final lens portion adjacent to the first lens portion, wherein the final lens portion includes:
  - a final entry surface, wherein the polychromatic light enters the final lens portion through the final entry surface;
  - a final exit surface opposing the final entry surface; and
  - a final diffraction portion adjacent to at least a section of the final exit surface, diffracting the polychromatic light, and
- wherein a white output light is released from the final exit surface.

2. The lens of claim 1, wherein the first lens portion having layers, wherein the layers include a laminate and the first diffraction portion, and wherein the first diffraction portion is a diffraction film adhered to the laminate by an adhesive.

3. The lens of claim 2, wherein the first entry surface is disposed on the laminate and the first exit surface is disposed on the diffraction film.

4. The lens of claim 1, wherein the final lens portion having layers, wherein the layers include a laminate and the final diffraction portion, and wherein the final diffraction portion is a diffraction film adhered to the laminate by an adhesive.

5. The lens of claim 4, wherein the final entry surface is disposed on the laminate and the diffraction film is disposed on at least a section of the final exit surface.

6. The lens of claim 1, wherein the first diffraction portion is a diffraction lens, wherein the diffraction lens having microscopic grooves disposed on at least a section of the first exit surface.

7. The lens of claim 1, wherein the final diffraction portion is a diffraction lens, wherein the diffraction lens having microscopic grooves disposed on at least a section of the final exit surface.

8. The lens of claim 1, further comprising at least one middle lens portion positioned between the first lens portion and the final lens portion, the at least one middle lens portion including:
- a middle entry surface, wherein the polychromatic light released from the first exit surface enters the at least one middle lens portion through the middle entry surface;
- a middle exit surface opposing the middle entry surface and wherein the polychromatic light is released from the middle exit surface; and
- a middle diffraction portion adjacent to at least a section of the middle exit surface, diffracting the polychromatic light.

9. The lens of claim 8, wherein the at least one middle lens portion having layers, wherein the layers include a laminate and the middle diffraction portion, and wherein the middle diffraction portion is a diffraction film adhered to the laminate by an adhesive.

10. The lens of claim 9, wherein the middle entry surface is disposed on the laminate and the diffraction film is disposed on at least a section of the middle exit surface.

11. The lens of claim 8, wherein the middle diffraction portion is a diffraction lens, wherein the diffraction lens having microscopic grooves disposed on at least a section of the middle exit surface.

12. An external light for a vehicle, the external light comprising:

one or more light sources, wherein the one or more light sources emit a polychromatic light; and a lens including:

a first lens portion adjacent to the one or more light sources, wherein the first lens portion includes:

a first entry surface, wherein the emitted polychromatic light enters the first lens portion through the first entry surface;

a first exit surface opposing the first entry surface and wherein the polychromatic light is released from the first exit surface; and a first diffraction portion adjacent to at least a section of the first exit surface, diffracting the emitted polychromatic light and creating distinct beams; and a final lens portion adjacent to the first lens portion, wherein the final lens portion includes:

a final entry surface, wherein the polychromatic light enters the final lens portion through the final entry surface;

a final exit surface opposing the final entry surface; and a final diffraction portion adjacent to at least a section of the final exit surface, diffracting the polychromatic light, and wherein a white output light is released from the final exit surface.

13. The external light of claim 12, wherein the first lens portion having layers, wherein the layers include a laminate and the first diffraction portion, wherein the first diffraction portion is a diffraction film adhered to the laminate by an adhesive, wherein the first entry surface is disposed on the laminate and the diffraction film is disposed on at least a section of the first exit surface.

14. The external light of claim 12, wherein the final lens portion having layers, wherein the layers include a laminate and the final diffraction portion, wherein the final diffraction portion is a diffraction film adhered to the laminate by an adhesive, wherein the final entry surface is disposed on the laminate and the diffraction film is disposed on at least a section of the final exit surface.

15. The external light of claim 12, wherein the first diffraction portion is a diffraction lens, wherein the diffraction lens having microscopic grooves disposed on at least a section of the first exit surface.

16. The external light of claim 12, wherein the final diffraction portion is a diffraction lens, wherein the diffraction lens having microscopic grooves disposed on at least a section of the final exit surface.

17. The external light of claim 12, further comprising at least one middle lens portion positioned between the first lens portion and the final lens portion, the at least one middle lens portion including:

a middle entry surface, wherein the polychromatic light released from the first exit surface enters the at least one middle lens portion through the middle entry surface;

a middle exit surface opposing the middle entry surface and wherein the polychromatic light is released from the middle exit surface; and a middle diffraction portion adjacent to at least a section of the middle exit surface, diffracting the polychromatic light.

18. The external light of claim 17, wherein the at least one middle lens portion having layers, wherein the layers include a laminate and the middle diffraction portion, wherein the middle diffraction portion is a diffraction film adhered to the laminate by an adhesive, wherein the middle entry surface is disposed on the laminate and the diffraction film is disposed on at least a section of the middle exit surface.

19. The external light of claim 17, wherein the middle diffraction portion is a diffraction lens, wherein the diffraction lens having microscopic grooves disposed on at least a section of the middle exit surface.

20. An external light for a vehicle, the external light comprising:

one or more light sources, wherein the one or more light sources emit a polychromatic light; and a lens including:

a first lens portion adjacent to the one or more light sources, wherein the first lens portion includes:

a first entry surface, wherein the emitted polychromatic light enters the first lens portion through the first entry surface;

a first exit surface opposing the first entry surface and wherein the polychromatic light is released from the first exit surface; and a first diffraction portion adjacent to at least a section of the first exit surface, diffracting the emitted polychromatic light and creating distinct beams;

at least one middle lens portion adjacent to the first lens portion, the at least one middle lens portion including:

a middle entry surface, wherein the polychromatic light released from the first exit surface enters the at least one middle lens portion through the middle entry surface;

a middle exit surface opposing the middle entry surface and wherein the polychromatic light is released from the middle exit surface; and a middle diffraction portion adjacent to at least a section of the middle exit surface, diffracting the polychromatic light; and a final lens portion adjacent to the at least one middle lens portion, wherein the final lens portion includes:

a final entry surface, wherein the polychromatic light released from the at least one middle lens portion enters the final lens portion through the final entry surface;

a final exit surface opposing the final entry surface; and a final diffraction portion adjacent to at least a section of the final exit surface, diffracting the polychromatic light, and wherein a white output light is released from the final exit surface.

* * * * *